May 21, 1935. W. PRUSSING Re. 19,578
AUTOMATIC TUBE FINISHING AND ADVANCING MACHINE
Original Filed March 28, 1931 3 Sheets-Sheet 1
Fig. 1
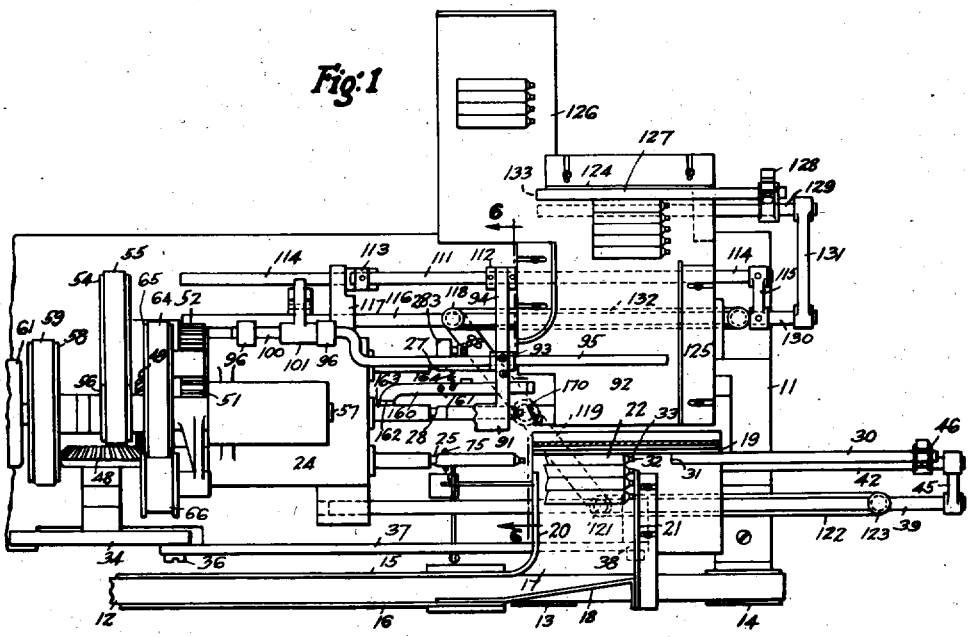
Fig. 2
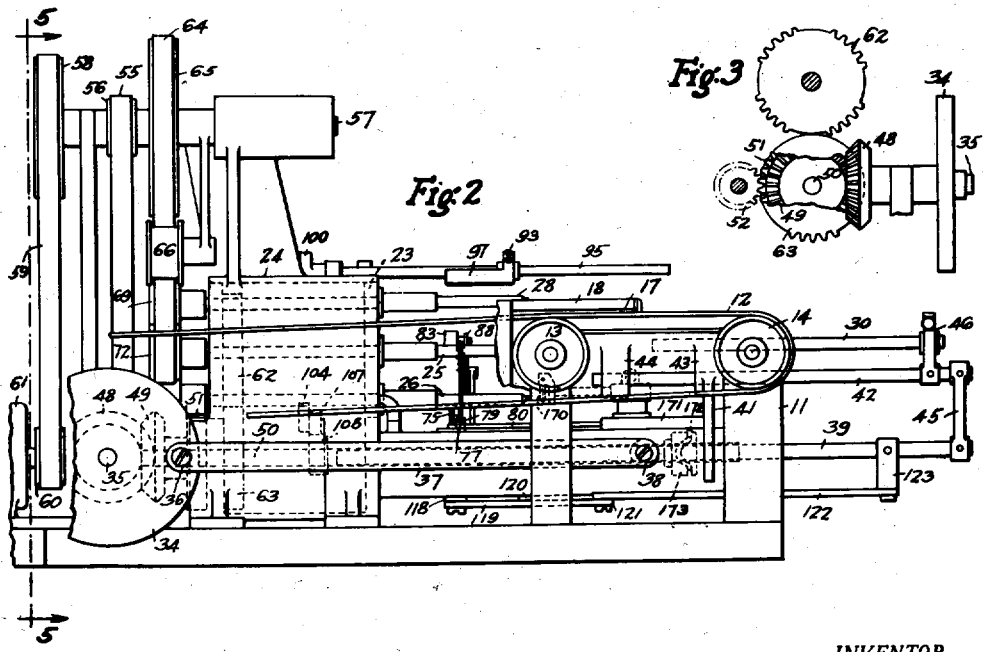
Fig. 3
INVENTOR.
Walter Prussing
BY Harry Jacobson
ATTORNEY

AUTOMATIC TUBE FINISHING AND ADVANCING MACHINE

Original Filed March 28, 1931 3 Sheets-Sheet 2

INVENTOR.
Walter Prussing
BY Harry Jacobson
ATTORNEY.

May 21, 1935. W. PRUSSING Re. 19,578

AUTOMATIC TUBE FINISHING AND ADVANCING MACHINE

Original Filed March 28, 1931 3 Sheets-Sheet 3

INVENTOR.
Walter Prussing
BY Harry Jacobson
ATTORNEY.

Reissued May 21, 1935

Re. 19,578

UNITED STATES PATENT OFFICE 19,578

AUTOMATIC TUBE FINISHING AND ADVANCING MACHINE

Walter Prussing, Brooklyn, N. Y., assignor to Victor Metal Products Corporation, Brooklyn, N. Y., a corporation of New York Original No. 1,910,712, dated May 23, 1933, Serial No. 526,025, March 28, 1931. Application for reissue January 12, 1934, Serial No. 706,411

30 Claims. (Cl. 29—38)

This invention relates to machines wherein thin metal collapsible tubes are automatically mounted, then trimmed, threaded and dismounted from the machine for further operation thereon.

Machines have been known which have various stations at which the trimming operations upon the tube are automatically performed, and at which the threading operation for the neck of the tube is similarly performed. My invention contemplates the provision of means for discharging the trimmed and threaded tube from the machine automatically for further operating thereon, as well as for automatically delivering the tubes continuously to the machine and for mounting the tubes on a mandrel at one of the stations.

The various objects of my invention will be clear from the description which follows, and from the drawings, in which Fig. 1 is a top plan view of my improved machine, the front of the machine appearing at the top of the figure.

Fig. 2 is a rear elevation of the same.

Fig. 3 is an end view of part of the driving means.

Figure 4:
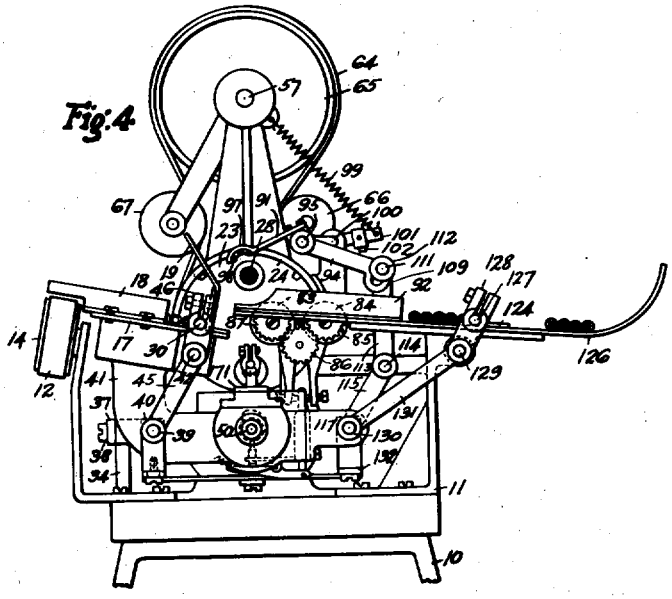
Fig. 4 is an end view of the right end of Figs. 1 and 2.

Figs. 8 to 12 inclusive are sectional views of the mandrel and of the tube supported thereon, showing various steps in the operation of trimming and threading the tube, including mounting the tube on the mandrel, trimming the tube, threading the neck thereof, straightening the indented part thereof, and dismounting it from the mandrel.

In that practical embodiment of my invention which I have illustrated by way of example, the machine may be mounted upon a stand as 10, and includes a suitable frame 11 and brackets connected thereto for supporting the various instrumentalities to be later described. Said instrumentalities include mechanism for feeding to the machine a continuous supply of extruded tubes in their unfinished condition, after they have been formed in a suitable extruding press such as is well known in the art; mechanism for feeding the tubes on to an intermittently rotating turret carrying revoluble mandrels; mechanism for trimming the neck and the open end of the tube on one of the mandrels while a tube is being fed to the preceding mandrel; mechanism for threading the trimmed neck of a tube on the succeeding mandrel, and mechanism for straightening and dismounting the trimmed and threaded tubes from the remaining mandrel.

After the tubes have been formed in a suitable extruding press not shown, they may be discharged from the press on to a suitable conveyer belt 12 (Figs. 1 and 2) suitably operated and guided as by means of the belt pulleys 13 and 14. Side guards as 15 and 16 serve to prevent the tubes from leaving the belt and guide said tubes. The tubes are thereby continuously supplied, in their proper longitudinal arrangement with the necks thereof forward, toward the inclined supporting plate 17. Arranged rearwardly of said supporting plate and in the path of the advancing tubes is the discharge plate 18, angularly disposed to the moving belt in such a manner that the tube as it is forwarded by the belt against the plate 18, is gradually forced off said belt on to the inclined plate 17. The tubes, in succession, roll by gravity toward the front end of said plate against the stop 19, the tubes arranging themselves between the upstanding guards 20 and 21 and in parallel relation, with the necks of the tubes all lying in the same relative position.

The last tube 22 of the row on the plate 17 may now be mounted upon the intermittently rotatable turret 23. Said turret is mounted in the casing 24 forming part of the frame of the machine and carries a multiplicity of identical mandrels as 25, 26, 27 and 28. Each of said mandrels terminates in a threaded tip 29 and is of less diameter than the interior diameter of the tube. The tube 22 is mounted upon the continuously rotating mandrel 25, while the turret is at rest, by the reciprocation of the mounting rod 30, the end 31 of which engages the end 32 of the tube and slides said tube longitudinally, off the plate 17 and on to the mandrel which at this time is aligned with the tube.

When the neck 33 of the tube reaches the rotating threaded tip 29 of the mandrel, the tip cuts into the interior surface of the neck 33, the tube being prevented from rotating at this time by the pressure on the end thereof exerted by the rod 30. Said rod, however, releases the tube as soon as the tip has cut its way sufficiently into the neck 33 of the tube to grip said tube firmly. The rod 30 is then reciprocated toward the right, as viewed in Figs. 1 and 2, ready for the feeding of the next tube. It will be seen that said rod prevents the succeeding tube in the row from interfering with the mounting operation of the last tube. On the withdrawal of the mounting rod, the next tube of the row together with the remaining tubes roll down along the plate 17 into position wherein said next tube may be fed on to the next mandrel after the turret has been rotated through a quarter turn.

The means for reciprocating the rod 30 comprises the disc crank 34 mounted on the shaft 35 and driven in a manner soon to be described. Pivoted to the crank 34, as at one end 36, is the link 37, which is secured at its other end 38 to the rod 39. Said rod 39 is slidable in a suitable bearing 40, secured to the frame of the machine as by means of the arm 41.

To the rod 39 is secured, as by means of the connecting member 45, the parallel rod 42 which is also supported in suitable bearings as 43 and 44 depending from the frame. The mounting rod 30 is in turn adjustably secured to the rod 42, as by means of the connecting member 46, which is adjustably secured to the rod 42 as by means of a suitable clamp. It will be seen that on rotation of the disc crank 34, the link 37 is reciprocated, thereby reciprocating the rods 39 and 42, and the mounting rod 30 as a unit, at the proper time to push the tube 22 on to the proper mandrel 25.

Figure 5:
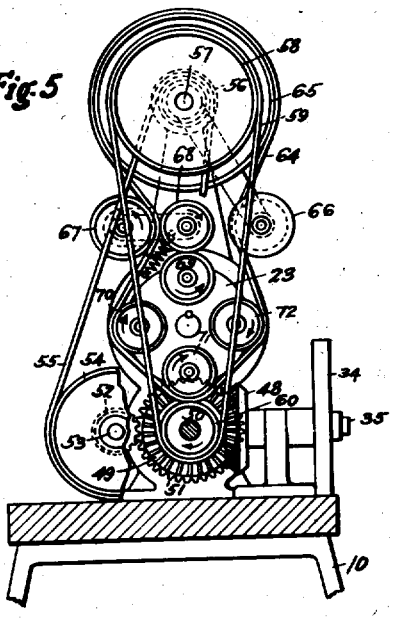
Fig. 5 is a similar view and partial section, taken on the line 5—5 of Fig. 2.

The crank 34 is rotated by means of the bevel gear 48 on the shaft 35, which gear meshes with the bevel gear 49 (Figs. 3 and 5) on the shaft 50. On said shaft 50 is also mounted the gear wheel 51, which meshes with the gear wheel 52 on the shaft 53. On said shaft 53 is also mounted the pulley 54 driven by the belt 55 from the pulley 56 on the upper shaft 57. The shaft 57 is in turn rotated by the pulley 58 thereon, which is driven by the belt 59 from the motor pulley 60. Said motor pulley, as shown in Fig. 2, is driven by a suitable motor as 61. It will be seen that the motor 61 may rotate continuously and thereby drives the shaft 57 and through the belt 55, drives the shaft 53 and the gear 52 thereon, which in turn rotates the gear wheel 51 and the bevel gear 49 on the shaft 50, and through the bevel gear 48 rotates the crank disc 34 to reciprocate the rod 30 at the proper time.

The means for intermittently rotating the turret 23 through the proper angle which in this case is an angle of 90°, to bring the various mandrels in succession to the various stations, is as follows:

As has been previously explained, the turret 23 is revolubly mounted in the casing 24. Mounted coaxially of and connected to said turret is the mutilated gear 62 adapted to mesh with the mutilated gear 63 on the shaft 50.

It will be seen that on the rotation of said shaft 50, the mutilated gear 63 drives the corresponding mutilated gear 62 to rotate the turret intermittently from station to station. The locking arm 150 enters the notch 151 at the proper time to maintain the turret at rest while the tubes are being operated upon, and is withdrawn from the notch to permit rotation of the turret, in a well known manner.

The mandrels 25, 26 and 27 are all rotated in the same direction but the mandrel 28 at the last station is rotated in the opposite direction for the purpose of dismounting the tube, as will later be more fully described. The mandrels are so rotated through the belt 64 driven by the pulley 65 on the shaft 57. Said belt 64 is tensioned by the idler pulleys 66 and 67, the belt being passed between the idler pulley 67 and the pulley 68. The idler pulley in turn drives the mandrel 28 by the engagement thereof with the mandrel pulley 69 mounted coaxially of the mandrel 28. The belt 64 also engages the pulleys 70, 71 and 72 and rotates said pulleys in the direction opposite to that in which the pulley 69 is rotated, and thereby rotates the mandrels 25, 26 and 27 in the direction opposite to that in which the mandrel 28 is rotated.

Figure 6:
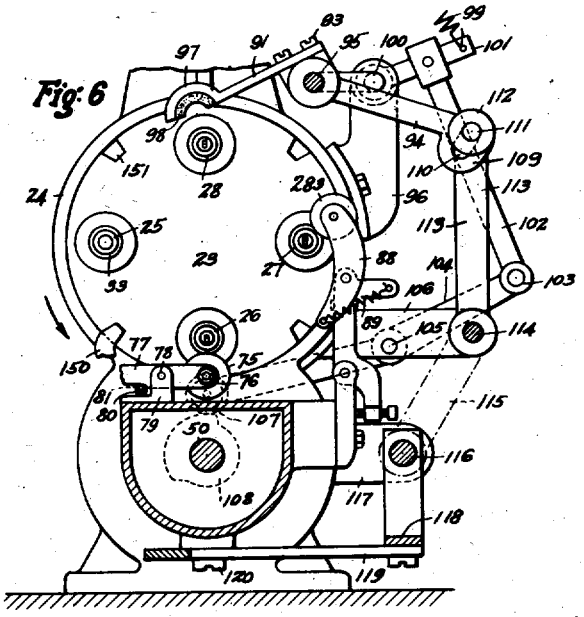
Fig. 6 is a vertical section, taken on the line 6—6 of Fig. 1.

It will be understood that on the rotation of the turret, the various mandrels, which are identical in construction, are brought in succession to the various stations, so that the numerals applied in the drawings to said mandrels indicate merely, the mandrel at the particular station described at the positions indicated in Fig. 6.

As has been previously explained, after the tube 22 is mounted on the mandrel 25, the turret is given a quarter turn so that the mandrel 25 is brought to the position indicated by the mandrel 26 of Fig. 6. At this station, the turret is at rest for a sufficient period to allow the trimming operations to be performed upon both ends of the tube 22.

Normally, the neck end trimming tool 170, of the usual and well known construction, is drawn to its extreme position at the right as shown in Fig. 1. However, as the mandrel with the tube mounted thereon is brought to the trimming station, the tool 170 is moved towards the left into position to trim the end 32 of the neck of the tube. Toward this end, the tool 170 is mounted on the reciprocatory T block 171 of Fig. 4, which slides in a corresponding groove in the frame of the machine. The pin 172 (Fig. 2) projecting from said block enters a suitable cam groove in the cam 173 mounted on the shaft 50 and thereby reciprocates the T block at the proper time into and out of engagement with the end 32 of the tube to trim said end sufficiently to expose the opening 74 in the neck of the tube.

Figure 7:
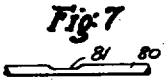
Fig. 7 is a front elevation of the operating rod for swinging the trimming cutter.
Figure 8:
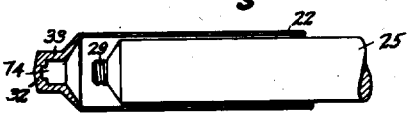
Figure 9:
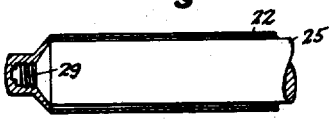
Figure 10:
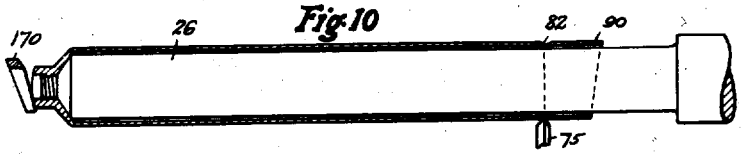
Figure 11:
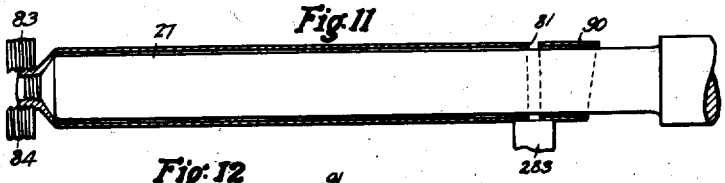
Figure 12:
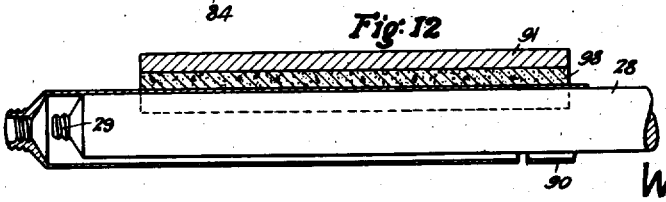

While the tool 170 is trimming the tube at one end and thereby pressing the tube firmly on the mandrel, the trimming wheel 75 cuts the tube to the proper length. Said trimming wheel or cutter 75 is revolubly supported as at 76 on the lever 77, (Fig. 6), which is in turn pivoted as at 78 to the bracket 79. A rod 80 (Fig. 7) having a suitable cam recess 81 therein, is reciprocated in a direction parallel to the axis of the cutter 75 so as to swing the lever 77 about its pivot 78 and to bring the cutter 75 into contact with the tube to cut it. When the lever 77 rests on the unmutilated part of the rod 80, the cutter 75 is withdrawn but when said rod is reciprocated into position wherein the cam recess 81 is directly below the lever 77, the lever drops into said recess and swings the cutter against the tube. The reciprocation of the rod 80 is effected by connecting said rod to the reciprocatory T block 171. It will be understood that the timing of the connections is such that the cutter 75 does not begin its trimming action until after the trimming tool 170 has exerted its full pressure upon the end of the tube, whereby the end 82 of the tube is cut into proper circular form and the tube is made accurately of the proper length. The trimming operation indents the tube slightly as shown in Fig. 10, but the tube is straightened later and the indent removed as will be later described.

After the trimming operation has been completed, the turret is rotated into the next station wherein the threading operation, (Fig. 11), upon a neck of the tube is performed, in a manner well known in the art as by the threading rolls 88, 89 which are rotated by the rotating tube on the mandrel 27, and which are maintained in the proper timed relation by the gears 85, 86 and 87. The rolls are mounted upon suitable levers and are normally out of engagement with the neck of the tube, but are moved into operative position by means which are well known in the art and hence which need not be further described. At the threading station, the roll 283, carried by the lever 86 and normally spring-pulled by the spring 88 against the tube, presses against the indented end 83 of the tube and straightens out said indent as well as the indent of the waste piece 90, to allow easy dismounting thereof.

At the station indicated by the mandrel 28 (Fig. 6), the tube together with the waste piece 90 is dismounted from the mandrel by the wiper arm 91, and drops into the inclined chute 92 from which the tube may be transferred to any suitable mechanism such as a printing or enamelling machine, or a machine for further forwarding or otherwise operating upon the tube. The wiper arm 91 is secured as by means of the screws 93 to the lever 94 which is in turn loosely mounted on the shaft 95. The arm 91 terminates the preferably semi-cylindrical portion 97, in which is inserted a suitable substantially semi-cylindrical member 98 of comparatively soft material, for engaging the tube on the mandrel 28 and for dismounting said tube.

The member 98 may be made of leather, cloth or other suitable soft and yieldable material adapted to engage and press upon the tube, without danger of injury thereto or deformation thereof.

The shaft 95 is straight and of sufficient length to allow movement of the lever 94 as a unit along and relatively to the shaft to perform the dismounting operation. The left end or extension 100 of said shaft, however, is bent forwardly of the part on which the lever is mounted, and is supported by suitable bearings 96 upstanding from the frame of the machine. It will be seen that rotation of the extension 100 in the bearings 96, rocks the lever 94 to engage and disengage the member 98 with and from the tube on the mandrel, the shaft 95 serving as a crank for that purpose.

The means for rocking the shaft end 100 comprises the crank 101 secured to said shaft and normally pulled by the spring 99 in the proper direction to rotate the shaft 100 in a counter-clockwise direction as viewed in Fig. 6 and to bring the member 98 into engagement with the tube. The crank 101 is oscillated in turn, through the link 102 secured at its lower end 103 to the lever 104, which is pivoted at 105 to a suitable bracket 106 extending from the frame of the machine, and which terminates in the cam roller 107 engaging the cam 108 on the shaft 50. The roller 107 being normally on the high part of the cam, the member 98 is normally maintained out of engagement with the tube. On rotation of the shaft 50, however, the roller 107 drops to the lower part of the cam under the influence of the spring 99 at the proper time to rock the lever 104 in a counter-clockwise direction, thereby oscillating the crank 101 through the link 102 whereby the extension 100 is oscillated and the shaft 95 carries the lever 94 into tube engaging position.

It will be noted that the end 109 of the lever 94 is slotted as at 110 to encompass the rod 111 so that the rocking movement of the lever may be performed without removing the end 109 from the rod 111.

Said end 109, while loose on the rod 111, moves with said rod, being maintained at a predetermined point along said rod by means of suitable collars 112 secured to the rod on each side of the lever. It will be seen that on longitudinal movement of the rod 111, the lever 94 is carried by said rod alternately the proper distance to the right and to the left as viewed in Figs. 1 and 2.

When moved towards the right, the spring 99 is allowed to become effective to oscillate the shaft 100 and bring the member 98 into frictional engagement with the tube, and whereafter the movement of the rod 111 serves to dismount the tube from the mandrel 28. Prior to the movement of the rod 111 toward the left, the roller 107 is on the high part of the cam 108 and the lever 94 is thereby oscillated to remove the member 98 from its engagement with the tube. The link 113 connects the rod 111 to the parallel rod 114 which is suitably mounted on the bracket 106 whereby movement of the rod 114 causes similar movement of the rod 111.

The rod 114 is reciprocated by means of the link 115 secured at one end to said rod and at its other end to the parallel rod 116 which slides in the bracket 117. The rod 116 is in turn reciprocated by the connecting member 118 secured to one end of the lever 119 which is pivoted as at 120 to the frame of the machine. At its other end 121, the lever 119 is secured as by means of the link 122 and the connecting member 123 to the reciprocating rod 39 (Figs. 1 and 2).

It will be seen that as the crank disc 34 rotates and reciprocates the rod 39, the lever 119 is oscillated, thereby sliding the rods 116, 114 and 111, and thereby causing reciprocation of the lever 94 at the proper time to dismount the straightened tube from the mandrel 28, and to further dismount the straightened waste member 90, the engaging member 98 being sufficiently long for that purpose and engaging with the tube with sufficient friction to hold it while it slides nevertheless on the mandrel, the member 98 cooperating with the mandrel to hold the tube therebetween during the dismounting operation.

It will be remembered that the tip 29 of the mandrel has been threaded into the inner face of the neck 74 of the tube and that the tube cannot be dismounted from the mandrel without first being disengaged from said tip. It is for this reason that the dismounting mandrel 28 is rotated in a direction opposite to that in which the remaining mandrels are rotated. When the lever 94, therefore, is rocked so that its engaging member 98 engages the tube, the tube is held stationary by said member by reason of the frictional engagement thereof during the continuous rotation of the mandrel in the proper direction first to disengage the tip from the tube neck. It is only after this disengagement has been completed that the lever 94 is moved toward the right to dismount the tube.

After the dismounting operation has been completed, the turret is again rotated by means of the mutilated gears 62 and 63 to bring the mandrel 28 into the position of the mandrel 25, ready for the mounting of a new tube thereon and a cycle of operations above described is automatically repeated.

As has been above indicated, the dismounted tube falls on the chute 92 and rolls down against the angle plate 124, the tubes being guided by the adjustable angle plate 125 secured to said chute so as to maintain the row of tubes in substantially aligned position as indicated in Fig. 1.

The end tube of the row is then transferred for further operation thereon either to another mechanism such as a conveyor, printing or enameling machine, or to a suitable receiving plate as 126. The transfer or forwarding of the tubes is accomplished automatically through the reciprocating rod 127, which is connected by the connecting member 128 to the reciprocating rod 129, said rod being in turn connected to the rod 130 as by means of the connecting member 131. The rod 130 is in turn reciprocated through its connection as at 132 to the reciprocating rod 116. It will therefore be seen that as the rod 116 is reciprocated, as previously described, the rod 127 is similarly reciprocated. In its extreme position toward the right, said rod 127 is out of the way of the row of tubes which roll down the chute 92 until the last tube of the row rests against the stop plate 124.

On the reciprocation of the rod 127 toward the left, the end 133 of said rod engages the neck end of the tube and forwards said tube toward the left either on to a suitable mandrel or conveyor or on to the plate 126, where the tubes may be inspected and again mounted on mechanism for performing further operations such as printing, enamelling or the like.

Since the threading and end trimming operations result in the accumulation of shavings on the bed of the machine, I prefer to provide means for sweeping the bed free of such shavings after each rotation of the turret. This is accomplished by the sweeping lever 160 pivoted to the bed as at 161 and having a lug 162 upstanding in the path of the left end 163 of the mandrel 26. As said mandrel is swung toward the position of the mandrel 27, the lug 162 is engaged and the lever 160 oscillated against the action of the spring 164 to sweep the bed clean.

It will be seen that I have provided automatic mechanism for mounting tubes fed continuously to the machine, for performing the various finishing operations on the tubes automatically, for dismounting the tubes and for then forwarding the tubes for further operation thereon.

While I have shown and described a certain specific embodiment of my machine, it will be understood that various changes may be made therein without departing from the spirit of my invention, and I therefore do not intend to limit myself to the embodiment shown and described but intend to claim my invention as broadly as may be permitted by the state of the prior art and the scope of the appended claims.

I claim:

1. In a tube finishing machine, a turret intermittently revoluble between a series of stations, a series of revoluble mandrels carried by the turret, means for mounting a thin, collapsible tube on a mandrel at one station, means for trimming both ends of the tube at the next station, and to separate a cylindrical waste piece from the remainder of the tube, means for threading the neck of the tube at the next succeeding station, a tube-engaging member, and means for moving the member coaxially of and also toward the mandrel into engagement with the outermost cylindrical surfaces of the tube and the waste piece for automatically dismounting the finished tube and the waste piece simultaneously at the last station, after the tube has been mounted, trimmed, and threaded.

2. In a tube finishing machine, a continuously revoluble mandrel, means for aligning a series of tubes including a plate and a stop, a reciprocatory rod for engaging the neck end of one of the aligned tubes and for pushing said tube upon the mandrel, means for advancing said mandrel, means for trimming both ends of the tube to separate an end waste portion from the remainder of the tube, said waste portion remaining on the mandrel, means for threading the neck of the tube, and means for dismounting the tube and the waste piece simultaneously from the mandrel comprising a reciprocating arm for engaging the outermost surfaces of the tube and the waste piece and for moving said tube and waste piece axially of the mandrel.

3. In a collapsible tube finishing machine, a mandrel, means for mounting a thin, soft metal, collapsible tube upon the mandrel, means for trimming both ends of the tube and for threading the neck thereof, and means for dismounting the tube from the mandrel including a reciprocating arm having a comparatively soft, yieldable, concave, cylindrical surface for engaging the outer cylindrical surface of the tube, and means for moving said arm axially of the mandrel and toward and from the mandrel.

4. In a collapsible tube finishing machine, a mandrel, and means for dismouting a collapsible tube which is substantially non-resistant to deformation from the mandrel comprising a reciprocatory arm terminating in a comparatively soft surface adapted to engage the surface of the tube frictionally with sufficient pressure to move said tube axially of and off the mandrel, while preventing injury to the frail tube.

5. In a collapsible tube finishing machine, a mandrel adapted to engage, support and rotate a collapsible tube which is substantially non-resistant to deformation, and means for dismounting the tube from the mandrel comprising a tube-engaging member having a comparatively soft tube-engaging surface adapted to prevent deformation of the tube, means for moving said surface into frictional contact with a substantial area of the surface of the tube, and means for moving said member axially of and away from the mandrel to carry the tube off the mandrel.

6. In a collapsible tube finishing machine, a continuously rotatable mandrel terminating in a threaded tip engaging the hollow neck of an easily deformable collapsible tube, and means for disengaging the tube from the tip and for dismounting the tube from the mandrel comprising a member movable into engagement with a substantial area of the surface of the tube and thereby halting the rotation of the tube to remove the threaded tip of the mandrel from the tube, and means for moving said member axially of the mandrel after it has engaged said tube surface, for then moving the member outwardly and away from the mandrel, and for then moving the member axially of the mandrel and toward its initial position.

7. In a collapsible tube finishing machine, a series of revoluble mandrels movable from station to station, means for continuously rotating said mandrels at all but one of the stations in the same direction, means for rotating the mandrel at one station in the opposite direction, means for mounting a tube on a mandrel at one station, means for trimming both ends of the tube and to separate an open end portion of the tube from the remainder of the tube at the next station, means for threading the neck of the tube and for straightening the indented ends of the tube and end portion at the next succeeding station, means for halting the rotation of the tube at the station in which the mandrel rotates in said opposite direction to disengage the tube from the mandrel, said means including an arm of sufficient length to engage the surfaces of the tube and said end portion and being reciprocatory in a direction axially of the mandrel to remove the tube and end portion from the mandrel, and means for advancing the tube after it has been removed from the mandrel.

8. In a tube finishing machine, a mandrel, means for mounting a thin, soft metal, collapsible tube on the mandrel, means for trimming the tube and for threading the neck thereof, and reciprocatory means including a member having a surface adapted to engage the outer surface of the tube along an area extending from one end of the tube toward the other end thereof for dismounting the tube from the mandrel.

9. In a tube finishing machine, a mandrel, means for mounting a thin, soft metal, collapsible tube on the mandrel, means for trimming the tube and for threading the neck thereof, reciprocatory means for engaging an area of the tube surface intermediate the ends of the tube for dismounting the tube from the mandrel, and reciprocatory means for advancing the tube after it has been dismounted.

10. In a tube finishing machine, a mandrel adapted to support a collapsible tube, and an oscillatory and reciprocatory tube-engaging member having a surface adapted to be brought into engagement with the surface of the tube, and means for moving the member after it has been brought into engagement with the tube surface for removing the tube from the mandrel.

11. In a tube finishing machine, a rotatable mandrel terminating in a threaded tip, and adapted to support a tube of greater diameter than that of the mandrel by the engagement of said tip with the hollow neck of the tube, and means for disengaging the tube from the tip of the mandrel and for removing the tube comprising a member adapted to be brought into engagement with the surface of the tube and thereby to halt the rotation thereof to disengage the threaded tip from the tube, and means for reciprocating said member after it has been brought into engagement with the tube.

12. In a machine for operating upon thin metallic collapsible tubes, a tube-dismounting arm, a lining on said arm of comparatively soft yieldable material having a concave tube-engaging surface, means for carrying said lining into engagement with the cylindrical surface of the tube, and means for reciprocating said arm.

13. In a machine for operating upon thin metallic collapsible tubes, a reciprocatory tube-dismounting arm, and a comparatively soft lining on said arm adapted to engage frictionally a substantial area of the outer cylindrical surface of a tube.

14. In a machine for operating upon thin metallic collapsible tubes, a mandrel, a dismounting arm provided with a concave area, a spring acting on the arm to urge it in one direction relatively to the mandrel, and means for moving said arm in the other direction relatively to the mandrel whereby said area is alternately drawn into engagement with the correspondingly shaped cylindrical area of a tube on the mandrel and releases said tube.

15. In a machine for operating upon thin cylindrical metallic collapsible tubes, a mandrel, a tube-engaging dismounting arm adapted to cooperate with said mandrel for frictionally engaging an area of the cylindrical surface of a tube held on the mandrel, and means for sliding the arm coaxially of the mandrel during its engagement with the tube and thereby dismounting the tube from the mandrel.

16. In a machine for operating upon thin metallic collapsible tubes, a tube-dismounting arm having a concave area, and means for oscillating said arm in one direction to carry the area into pressed engagement with the cylindrical surface of a tube, for then sliding said tube bodily in a given direction under the frictional pressure on said cylindrical surface, for then oscillating the arm in the other direction, and for then sliding said arm in the opposite from the given direction.

17. In a machine for operating upon thin metallic collapsible tubes, a tube-dismounting arm having a concave area, and a layer of friction material on said arm adapted to frictionally engage the cylindrical surface of a tube to move the tube on the movement of said arm.

18. In a machine for operating upon thin metallic collapsible tubes, a tube-supporting mandrel, an oscillatory and reciprocatory tube-engaging arm having a concave area adapted to engage part of the convex cylindrical surface of a tube for dismounting the tube from the mandrel, and means for advancing the dismounted tube for further operation thereon.

19. In a machine for operating upon thin metallic collapsible tubes, a tube-supporting mandrel, a dismounting arm adapted to be brought into frictional engagement with a tube on said mandrel, an inclined tube-supporting plate below and beyond the mandrel, and means for reciprocating the arm to a position over said plate after the arm has been brought into engagement with the tube for dismounting the tube from the mandrel and for forwarding the tube on to said plate.

20. In a machine for operating upon thin metallic collapsible tubes, a tube-supporting mandrel, a dismounting arm adapted to be brought into frictional engagement with a tube on said mandrel, an inclined tube-supporting plate below and beyond the mandrel, means for reciprocating the arm to a position over said plate after the arm has been brought into engagement with the tube for dismounting the tube from the mandrel and for forwarding the tube on to said plate, a stop at the lower end of the plate, and means for advancing the tube after it has rolled down into engagement with said stop.

21. In a machine for finishing thin, soft metal, collapsible tubes, a rotatable tube-supporting mandrel, a tube-supporting plate below and beyond the mandrel, a tube-aligning stop adjacent said plate, a tube-mounting rod, mechanism connected to a moving part of the machine and to said rod for reciprocating the rod to engage one end of a tube supported by said plate and to mount the tube on the mandrel, means for severing the other end portion of the tube while the tube is on the mandrel, said end portion being retained on the mandrel, a tube dismounting arm provided with a surface adapted to be brought into engagement with the surfaces of the tube and of the severed end portion, and mechanism connected to a moving part of the machine for reciprocating the arm after it has been brought into engagement with the tube and the end portion to dismount the tube and the end portion from the mandrel.

22. In a machine for operating upon thin metallic collapsible tubes, a tube-supporting mandrel, a dismounting arm adapted to be brought into frictional engagement with the upper part of the outermost surface of a tube on said mandrel, said arm being arranged adjacent said mandrel, and means for reciprocating the arm through a distance substantially equal to the length of the tube after the arm has been brought into engagement with the tube surface for dismounting the tube from the mandrel.

23. In a machine for operating upon thin metallic collapsible tubes, a tube-supporting mandrel, means for trimming the open end of the tube to form a plane end thereon and to separate a tubular waste piece therefrom, and means for dismounting the tube and the waste piece from the mandrel simultaneously including a movable member adapted to engage the tube and the waste piece.

24. In a machine for operating upon thin metallic collapsible tubes, a tube-supporting mandrel, means beyond and below the mandrel for supporting and aligning a series of tubes, a reciprocating rod, mechanism connected to a moving part of the machine for reciprocating the rod to push upon the adjacent end of the aligned tube and to mount said tube upon the mandrel, means for trimming the other end of the tube and to separate a waste piece therefrom, means for advancing the mandrel into tube-dismounting position, a reciprocating arm for dismounting the tube and the waste piece from the mandrel, a tube-supporting plate for the dismounted tubes below and adjacent the dismounting position of the mandrel, and a reciprocating rod operatively connected to a moving part of the machine for advancing the dismounted tube from said plate.

25. In a machine for operating upon thin metallic collapsible tubes, a tube-supporting mandrel, means for finishing the tube, means for dismounting the finished tube from the mandrel, a tube-supporting plate adjacent the mandrel and adapted to receive the finished dismounted tube, and reciprocating means for removing the finished tube from said plate and for advancing the tube.

26. In a collapsible tube-finishing machine, a rotatable tube-supporting mandrel, a member adapted to be brought into frictional engagement with a part of the outer cylindrical surface of the tube to halt the rotation of the tube with the mandrel, and means for reciprocating said member while said member engages said surface to remove the tube from the mandrel.

27. In a collapsible tube finishing machine, a mandrel, means for mounting a tube on the mandrel, means for trimming the tube and for severing an end piece therefrom, reciprocatory means for simultaneously dismounting the tube and the end piece from the mandrel, a plate adjacent the mandrel for receiving the dismounted tube, and reciprocatory means cooperating with the plate for advancing the tube, after it has been dismounted on to the plate.

28. In a collapsible tube finishing machine, a mandrel adapted to support a tube, a movable member adapted to engage part of the outer cylindrical surface of the tube, and means for first moving the member into engagement with the tube surface and for then sliding the member out of its initial position and axially of the mandrel in one direction, then to move the member away from the mandrel and to slide said member in the opposite direction back to its initial position.

29. In a collapsible tube finishing machine, a mandrel adapted to support a tube, means including a movable member for engaging part of the outer cylindrical surface of the tube, and means for removing the tube from the mandrel including means for sliding the member axially of the mandrel in one direction, then to move the member away from the axis of the mandrel and to slide said member back in the opposite direction.

30. In a machine for operating upon thin collapsible tubes, a tube-supporting mandrel, a partly cylindrical member adapted to be brought into firm engagement with the surface of the tube on the mandrel, and means for first moving the member relatively to and toward the mandrel and into engagement with the surface of the tube and then to move the tube and the member as a unit bodily in the direction of the axis of the mandrel to dismount the tube from the mandrel.

WALTER PRUSSING.